United States Patent
Enescu et al.

(10) Patent No.: US 9,467,181 B2
(45) Date of Patent: Oct. 11, 2016

(54) RADIO FREQUENCY RECEIVER CAPABLE OF DETERMINING A NOISE ESTIMATE IN CASE OF RECEIVED POWER UNBALANCED ANTENNAS AND METHOD OF OPERATING THEREOF

(71) Applicant: FREESCALE SEMICONDUCTOR, INC., Austin, TX (US)

(72) Inventors: Andrei-Alexandru Enescu, Bucharest (RO); Anton Antal, Bucharest (RO)

(73) Assignee: FREESCALE SEMICONDUCTOR, INC., Austin, TX (US)

(*) Notice: Subject to any disclaimer, the term of this patent is extended or adjusted under 35 U.S.C. 154(b) by 0 days.

(21) Appl. No.: 14/710,828

(22) Filed: May 13, 2015

(65) Prior Publication Data

US 2016/0269063 A1    Sep. 15, 2016

(30) Foreign Application Priority Data

Mar. 12, 2015   (RO) .................................. 2015-00186

(51) Int. Cl.
| | | |
|---|---|---|
| H04B 1/00 | (2006.01) | |
| H04B 1/12 | (2006.01) | |
| H04B 1/10 | (2006.01) | |

(52) U.S. Cl.
CPC ............ *H04B 1/123* (2013.01); *H04B 1/1027* (2013.01)

(58) Field of Classification Search
CPC  H04B 7/0854; H04B 17/336; H04B 17/345; H04B 7/086; H04B 7/0417; H04B 7/063; H04B 7/0632; H04B 7/0639; H04L 1/0048; H04L 1/005; H04L 1/06; H04L 25/0204; H04L 25/022; H04L 25/0224; H04L 25/0242; H04L 27/2636; H04L 27/26
USPC ........................................................ 455/63.1
See application file for complete search history.

(56) References Cited

U.S. PATENT DOCUMENTS

| | | | | |
|---|---|---|---|---|
| 2003/0076900 A1* | 4/2003 | Magee | ................... | H04L 1/206 375/316 |
| 2006/0251156 A1* | 11/2006 | Grant | ................... | H04B 1/7103 375/148 |
| 2014/0160949 A1 | 6/2014 | Clausen et al. | | |

OTHER PUBLICATIONS

Kin K. Leung, Jack H. Winters, Leonard J. Cimini, Jr: "Interference Estimation With Noisy Measurements in Broadband Wireless Packet Networks", Vehicular Technology Conference, 2001. VTC 2001 Fall. IEEE VTS 54th, pp. 1125-1129, vol. 2, ISBN 0-7803-7005-8.

(Continued)

*Primary Examiner* — Ajibola Akinyemi

(57) ABSTRACT

The present application suggests a receiver and a method of operating thereof for determining a noise estimate based on a radio frequency signal from an interference source over different propagation paths through a plurality of antennas. A covariance matrix estimator coupled through separate processing paths to a respective one of the plurality of antennas is arranged to determine an estimate of a covariance matrix based on the received radio frequency signal. A noise estimator coupled to the covariance matrix estimator for receiving the estimate of the covariance matrix is arranged to determine a noise estimate by solving a polynomial equation of second order as a function of the noise estimate on the basis the elements of the covariance matrix estimate relating to a set of two antennas.

16 Claims, 6 Drawing Sheets

(56) References Cited

OTHER PUBLICATIONS

A. Pudeyev, A. Maltsev, A. Rubtsov, S. Tiraspolsky: "Selective interference cancellation using Kalman filtering", Wireless Communication Systems, 2006. ISWCS '06. 3rd International Symposium on, pp. 21-24, ISBN 978-1-4244-0398-1.

* cited by examiner

RADIO FREQUENCY RECEIVER CAPABLE OF DETERMINING A NOISE ESTIMATE IN CASE OF RECEIVED POWER UNBALANCED ANTENNAS AND METHOD OF OPERATING THEREOF

CROSS REFERENCE TO RELATED APPLICATION(S)

The present application claims priority to Romanian Patent Application No. RO A 2015 00186, entitled "RADIO FREQUENCY RECEIVER CAPABLE OF DETERMINING A NOISE ESTIMATE IN CASE OF RECEIVED POWER UNBALANCED ANTENNAS AND METHOD OF OPERATING THEREOF," filed on Mar. 12, 2015, the entirety of which is herein incorporated by reference.

FIELD OF THE INVENTION

The invention relates to the field of radio frequency communications, and more particularly to the technique of determining noise estimate in multiple-antenna receivers of wireless radio frequency networks, in particular cellular radio frequency networks.

BACKGROUND

In RF communications systems multiple user equipment (UEs) may share the same frequency and time resource such that mutual interference may occur. In order to ensure a desired reception quality and performance of mobile communications in RF communication systems knowledge about noise on the RF channels is desirable to enable an appropriate adaptation of signal characteristics to current noise conditions. In particular, noise estimation may return incorrect estimation values due to additional interference superposed over the noise and due to the fact that this interference is in the form of imbalanced signals received at the antennas of multiple-antenna receives.

SUMMARY

The present invention provides a radio frequency receiver capable of determining a noise estimate in case of unbalanced antennas, a method of operating thereof and a non-transitory, tangible computer readable storage medium bearing computer executable instructions for operating/performing the apparatus and the method as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION

Figure 1:
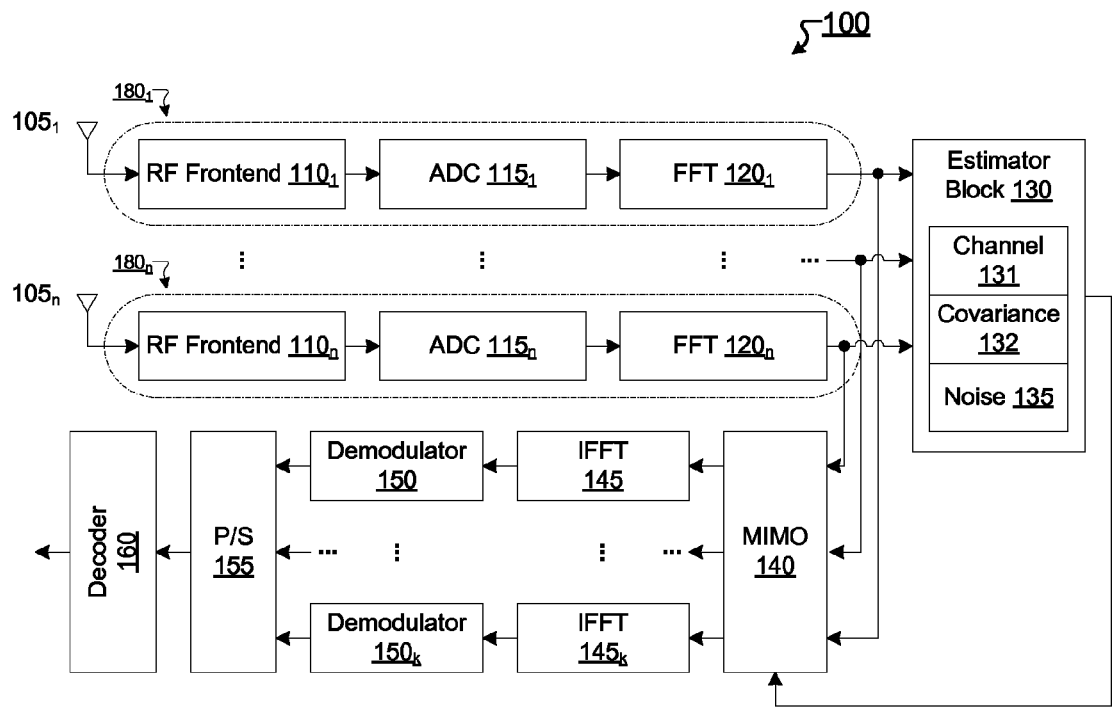
FIG. 1 schematically illustrates a block diagram of an exemplary receiver according to an embodiment of the present application.

In the following, embodiments are described with reference to the drawings wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense, and the scope of protection is defined by the appended claims.

The various aspects summarized may be embodied in various forms. The following description shows by way of illustration various combinations and configurations in which the aspects may be practiced. It is understood that the described aspects and/or embodiments are merely examples and that other aspects and/or embodiments may be utilized and structural and functional modifications may be made without departing from the scope of the present disclosure. In addition, while a particular feature or aspect of an embodiment may be disclosed with respect to only one of several implementations, such feature or aspect may be combined with one or more other features or aspects of the other implementations as it may be desired and advantageous for any given or particular application.

In the following, various methods and receiver circuits are described separately or with reference to each other. It is understood that comments made in connection with a described method may also hold true for a corresponding receiver circuit configured to perform the method and vice versa. For example, if a specific method step is described, a corresponding receiver circuit may include a unit to perform the described method step, even if such a unit is not explicitly described or illustrated in the figures.

The methods and receiver circuits described herein may be used for various wireless communication networks such as Code Division Multiple Access (CDMA), Time Division Multiple Access (TDMA), Frequency Division Multiple Access (FDMA), Orthogonal FDMA (OFDMA) and Single Carrier FDMA (SC-FDMA) networks. The terms "network", "system" and "radio communications system" may be used synonymously. A CDMA network may implement a radio technology such as Universal Terrestrial Radio Access (UTRA), cdma2000, etc. UTRA includes Wideband-CDMA (W-CDMA) and other CDMA variants. Cdma2000 covers IS-2000, IS-95 and IS-856 standards. A TDMA network may implement a radio technology such as Global System for Mobile Communications (GSM) and derivatives thereof such as, e.g., Enhanced Data Rate for GSM Evolution (EDGE), Enhanced General Packet Radio Service (EGPRS), etc. An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). In particular, the methods and receiver circuits described herein may be used in the framework of mobile communication standards supporting multiple predefined modulation schemes or modulation alphabets. For example, the 3GPP Long Term Evolution (LTE) standard, which is based on the GSM/EDGE and UMTS/HSPA (High Speed Packet Access) technologies, supports QPSK, 16-QAM and 64-QAM. Similarly, each of WiMAX and Wireless LAN supports BPSK, QPSK, 16-QAM and 64-QAM.

In radio communications systems, a transmitter transmitting one or more radio communications signals over one or more radio communications channels is used. The transmitter may be a base station (BS) or a transmitting device included in a user's device, such as a mobile radio transceiver, a handheld radio device or any similar device. A base station may also be referred to as "NodeB" or "eNodeB". Radio communications signals transmitted by transmitters may be received by receivers such as a receiving device in a mobile radio transceiver or mobile station, a handheld radio device or any similar device. Receiver circuits as described herein may e.g. be included in such receivers. A mobile station may also be referred to as "User Equipment" (UE).

Wireless communication systems are subjected to the restrictions of limited RF spectrum and finite resources. In order to achieve more throughputs in wireless communication systems the networks' multipath conditions for MIMO, targeting both rich scattering conditions and high SNR for each multipath signal, have to be monitored. The monitoring process requires accurate measurement of these multipath conditions in order to achieve the best performance for a given environment while avoiding the time and expense of guesswork. With strong measurements, however, an optimized MIMO system can result in massive throughput gains without the expenses associated with adding spectrum or eNodeBs.

The methods and receiver circuits described herein may relate to a Multiple Input Multiple Output (MIMO) system providing the use of multiple antennas at both the transmitter and receiver. The methods and receiver circuits described herein may also relate to a system having only one antenna at the receiver. MIMO is a part of wireless communications standards such as e.g. IEEE 802.11n (Wi-Fi), 4G, 3GPP Long Term Evolution (LTE), WiMAX (specifically WiMAX 802.16e-2005) and HSPA+ (specifically Release 7 and following Releases). The methods and receiver circuits described herein may be operated in accordance with one or more of these standards or other standards.

The term "spatial multiplexing" as used herein corresponds to a transmission technique in MIMO wireless communication used to transmit independent and separately encoded data signals, so-called data streams, from different transmit antennas of a base station. Similarly, a UE may receive multiple transmitted data streams by means of a plurality of receive antennas. Such independent data streams are also referred to as "layers" in the art. The encoding of data in spatial multiplexing may be based on an open-loop approach or a closed-loop approach.

When the individual data streams (layers) are assigned to a single user, this is called Single-User (SU) MI MO. Otherwise, when the individual data streams (layers) are assigned to various users, this is called Multi-User (MU) MIMO. The benefit of using MU-MIMO transmission is the naturally independent signals cross the receive antennas mounted over physically distributed UEs. MU-MIMO schemes allow multiple UEs to share the same resource in e.g. frequency and time domains, i.e. the same resource blocks, and multiplex their signals on the spatial domain. MU-MIMO may be regarded as an extended version of the Space-Division Multiple Access (SDMA) scheme. In 3G/HSPA MU-MIMO, the UEs may also share the same resource in e.g. time and channelization code (e.g. Orthogonal Variable Spreading Factor (OVSF)/Spreading Code).

One problem encountered with the deployment of advanced receivers is obtaining reliable channel quality indication (CQI) estimation and modulation and coding scheme (MCS) selection. CQI estimates are used, for example, for link adaptation and scheduling in the uplink of LTE.

Referring now to FIG. 1, a block diagram schematically illustrating a receiver architecture 100 according to an example of the present invention is shown. The receiver architecture comprises several antennas and associated individual signal processing paths $180_1$ to $180_n$ for each antenna $105_1$ to $105_n$. It should be understood that two exemplary antennas, antennas $105_1$ and $105_n$, and signal processing paths, signal processing paths $180_1$ and $180_n$, are illustrated for the sake of illustration.

Accordingly, each signal processing path $180_1$ to $180_n$ comprises an antenna $105_1$ to $105_n$ to receive RF signals, in particular OFDM (Orthogonal Frequency Division Multiplexing) signals. The received RF signals are processed in front end receiver circuits $110_1$ to $110_n$ each associated with respective one of the antennas $105_1$ to $105_n$. The front end receiver circuits $110_1$ to $110_n$ may include, e.g., one or more functional blocks for low-noise amplification, frequency down-conversion, analog filtering, and the like. The RF signals from the respective front end receiver circuit $110_1$ to $110_n$ are then digitized by a respective one of the analog-to-digital converters (ADCs) $115_1$ to $115_n$. The digitized RF signals outputted by the ADCs $115_1$ to $115_n$ may be further signal processed including e.g. baseband filtering by a respective digital filter block (not shown) and cyclic prefix (CP) removing by a CP removal bloc (not shown) and the like.

The digitized RF signals are processed by a frequency transform block, such as FFT (Fast-Fourier Transform) blocks $120_1$ to $120_n$ of the respective one of the processing paths or DFT (Discrete-Fourier Transform) blocks (not shown), at determined FFT timing instances to generate sets of data samples in frequency domain. The resulting sets of frequency domain samples for all subcarriers may be stored in a buffer and utilized by an estimation block 130 including inter alia a channel response estimation block 131 and a covariance matrix estimation block 132 to produce channel estimates for the sets of frequency domain signals.

The frequency transform processing and channel estimation 131 is performed for all frequency domain samples. The covariance matrix estimation block 132 additionally calculates covariance matrix estimates for each set of frequency domain samples, which are correlated with the other sets of frequency domain samples.

For the sake of simplicity of illustration, the block diagram does not show a CP removal block. Those skilled in understand the when no cyclic prefix (CP) is used in the OFDM symbols, the delay spread should not exceed the symbol length of the OFDM symbols. The use of cyclic prefix (CP) removal allows delay spread extending the symbol length of the OFDM symbols. Some exemplary values for the FFT parameters may be N=128, 256, 512, 1024 or 2048.

The MIMO signal separation block 140 receives the sets of frequency domain samples and performs signal separation and channel compensation on the signals input from the signal processing paths and outputs the resultant signals to inverse frequency transform blocks, such as inverse Fast-Fourier transform (IFFT) blocks $145_1$ to $145_k$ or inverse Discrete-Fourier transform (IDFT) blocks (not shown), and demodulator blocks $150_1$ to $150_k$. The RF signal output from the signal separation block 140 and the inverse Fast Fourier transform block $145_1$ to $145_k$ is demodulated by the demodulator blocks $150_1$ to $150_k$ based on the modulation performed in the transmitter. The MIMO signal separation block 140 may output one or more signals representing one or more sequences of code words. The receiver 100 may provide an inverse Fast Fourier transform (IFFT) block $145_1$ to $145_k$ and a demodulator block $150_1$ to $150_k$ for each sequence of code words in the signal outputted by the MIMO signal separation block 140. The processing of the sequences of code words may further comprise a deinterleaver block (not shown) to perform processing to deinterleave the bit sequence interleaved in the transmitter and an error correction decoder block (not shown) to perform error correction decoding processing to obtain the transmitted information bit sequence. A P/S converter block 155 performs processing to arrange parallel processed sequences of code words in series. The output of the P/S converter block 155 is delivered to an upper layer as information data. The receiver 100 further includes for instance a decoder block 160, which is configured to receive from the P/S converter block the sequences of code words in series and decode the sequences of code words into separate channels.

Those of skill in the art will readily recognize that blocks depicted in FIG. 1, such as the ADCs 115, filter blocks (not shown), CP removal blocks (not shown), FFT blocks 120, inverse FFT blocks 145, channel response, covariance matrix, and noise estimation blocks 130, 131, 132, 135, MIMO signal separation block 140, demodulator blocks 150, the P/S converter block 155 and the decoder block 160 described above as functional blocks may be implemented as analog or digital hardware circuits, as programmable logic coupled with appropriate firmware, or as software modules executing one or more a general-purpose processors or Digital Signal Processors (DSP). Furthermore, any or all of the functional blocks may be merged, and/or functionality included in one block may be separated into two or more functional blocks.

Figure 2:
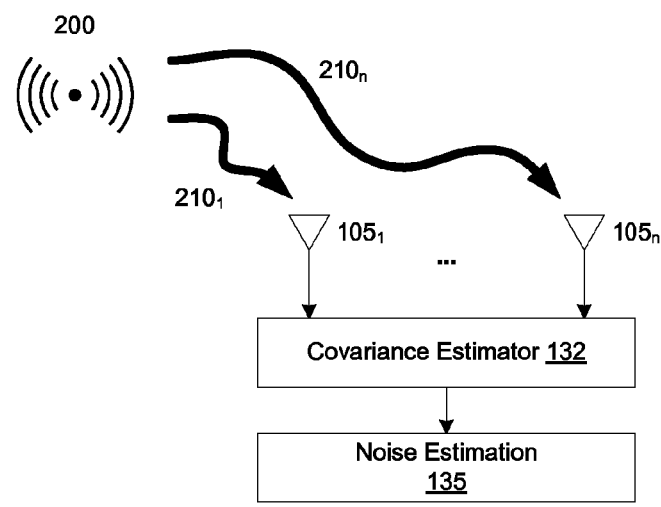
FIG. 2 schematically illustrates a block diagram showing a typical application scenario of an exemplary receiver according to an embodiment of the present application.

Now referring to FIG. 2, a schematic block diagram of an RF environment with an interference source 200 is shown. RF signal of the interference source 200 is received separately by each of the several antennas $105_1$ to $105_n$ of the receiver 100 according to an example of the present invention. Each of the RF signals received by the antennas $105_1$ to $105_n$ is received through a different path of signal propagation $210_1$ to $210_n$. It should be assumed that the RF signals from the interference source 200 are received in the absence of any data and/or control RF signal terminating at the receiver 100.

The determining of the covariance matrix estimation from the interference source 200 allows for determining a noise estimation. The covariance matrix estimation based on the RF signals received from the interference source 200 via the antennas $105_1$ to $105_n$ allows for determining a noise estimation in case the RF interfering signals received through different propagation paths $210_1$ to $210_n$ and processed on different signal processing paths $180_1$ to $180_n$ are unbalanced with respect to the receiver power. Unbalanced RF signals may be observed because of non-correlated RF channels and/or differing path losses in the signal processing at the receiver. The receiver 100 shown in FIG. 2 comprises a noise estimation block 135 coupled to the covariance matrix estimation block 132 to receive the covariance matrix estimation and arranged to determine a noise estimation thereof.

The measured RF signal $r_j$ received from the interference source 200 via the antenna $105_j$ is described in the following form:

$$r_j = h_j \cdot I + N,$$

where $h_j$ represents the response of the channel j, on which the interference signal I is received, and N represents the noise on the channel.

For the following discussion, the covariance matrix C is in the form below:

$$C = \begin{bmatrix} c_{11} & \cdots & c_{1n} \\ \vdots & \ddots & \vdots \\ c_{n1} & \cdots & c_{nn} \end{bmatrix} = \begin{bmatrix} |h_1|^2 I + N & \cdots & h_1 h_n^* I \\ \vdots & \ddots & \vdots \\ h_n h_1^* I & \cdots & |h_n|^2 I + N \end{bmatrix},$$

where $$c_{jk} = c_{j,k} = E\{r_j \cdot r_k^*\} = h_j \cdot h_k^* \cdot I + N\delta_{jk}, \text{ and}$$

$$\delta_{jk} = \begin{cases} 1, & k = j \\ 0, & k \neq j \end{cases},$$

and wherein the noise N is assumed to be uncorrelated.

Taking into consideration the premise that the channels are non-correlated, the channel responses $h_j$ differ from each other, i.e. $h_j \neq h_k$ for $j \neq k$ and k, j=1, ..., n, where n represents the number of antennas of the receiver. Whereas above, the general case of a receiver with n antennas has been described, in the following a receiver with two antennas will be considered first.

In case the receiver 100 has two antennas $105_1$ and $105_2$, where n=2, the covariance matrix C is in the following form:

$$C = \begin{bmatrix} c_{11} & c_{12} \\ c_{21} & c_{22} \end{bmatrix} = \begin{bmatrix} |h_1|^2 I + N & h_1 h_2^* I \\ h_2 h_1^* I & |h_n|^2 I + N \end{bmatrix}$$

where $$c_{jk} = E\{r_j \cdot r_k^*\} = h_j \cdot h_k^* \cdot I + N\delta_{jk} \text{ and } j, k = 1, 2$$

The polynomial equation of second order being a function of the noise estimate $\hat{N}$ can be formulated on the basis of the covariance matrix elements $c_{jk}$:

$$(c_{11} - \hat{N}) \cdot (c_{22} - \hat{N}) = c_{12} c_{21}$$

$$\hat{N}^2 - \hat{N}(c_{11} + c_{22}) + c_{11} c_{22} - c_{12} c_{21} = 0$$

The equation of second order can be analytically solved for the noise estimate $\hat{N}$:

$$\hat{N} = \frac{T \pm \sqrt{T^2 - 4\Delta}}{2}$$

$$\Delta = c_{11} c_{22} - c_{12} c_{21}$$

$$T = c_{11} + c_{22}$$

The relevant solution of the polynomial equation of second order is the lower value:

$$\hat{N} = \min\left\{\frac{T \pm \sqrt{T^2 - 4\Delta}}{2}\right\} = \frac{T - \sqrt{T^2 - 4\Delta}}{2},$$

Consider that $\Delta = c_{11} c_{22} - c_{12} c_{21} > 0$.

The solution may be further approximated for the cases where the contribution by the noise N is substantially stronger or weaker than the interference signal I. The above solution may be rewritten as following:

$$\hat{N} = \frac{T - \sqrt{T^2 - 4\Delta}}{2} = \frac{T}{2}\left(1 - \sqrt{1 - 4\frac{\Delta}{T^2}}\right)$$

If it is assumed that N<<I:

$$\Rightarrow \frac{c_{11} c_{22}}{c_{12} c_{21}} = \frac{(|h_{11}|^2 \cdot I + N)(|h_{22}|^2 \cdot I + N)}{h_1 h_2^* I \cdot h_2 h_1^* I} \approx 1$$

$$\Rightarrow T \gg \Delta$$

$$\Rightarrow \hat{N} = \frac{T}{2}\left(1 - \sqrt{1 - 4\frac{\Delta}{T^2}}\right) \approx \frac{\Delta}{T}$$

when taken into account that $$\sqrt{1 + x} \approx 1 + \frac{x}{2} \text{ for } x \ll 1.$$

If it is assumed that N>>I:

$$\Rightarrow \frac{c_{11} c_{22}}{c_{12} c_{21}} = \frac{(|h_{11}|^2 \cdot I + N)(|h_{22}|^2 \cdot I + N)}{h_1 h_2^* I \cdot h_2 h_1^* I} \gg 1$$

$$\Rightarrow \Delta \approx c_{11} c_{22}$$

-continued $$T^2 - 4\Delta \approx c_{11}^2 + 2c_{11}c_{22} + c_{11}^2 - 4c_{11}c_{22}$$
$$= c_{11}^2 - 2c_{11}c_{22} + c_{11}^2$$
$$= (c_{11} - c_{22})^2$$

$$\hat{N} = \min\left\{\frac{T \pm \sqrt{T^2 - 4\Delta}}{2}\right\}$$

$$\Rightarrow \hat{N} \approx \min\left\{\frac{c_{11} + c_{22} \pm (c_{11} - c_{22})}{2}\right\}$$

$$\Rightarrow \hat{N} \approx \min\{c_{11}, c_{22}\}$$

Figure 3:
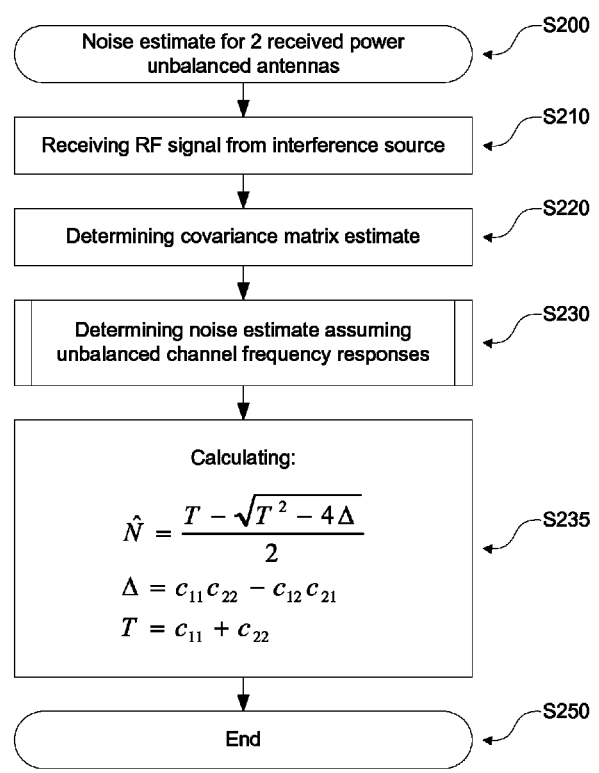
FIG. 3 schematically illustrates an exemplary flow diagram for determining a noise estimate in case of two received power unbalanced antennas according to an embodiment of the present application.

Referring now to FIG. 3, a flow diagram is schematically illustrated exemplifying an operational flow for determining a noise estimation at a receiver with two antennas, n=2, receiving unbalanced power.

The radio frequency signal is received from the interference source 200 through the two antennas 105₁ and 105₂. The received radio frequency signal propagates over differing signal propagation paths 210₁ and 210₂ to the respective antennas 105₁ and 105₂ and the received radio frequency is processed on signal processing paths 180₁ and 180₂ in the receiver arrangement 100 before being supplied to the covariance estimator 132 in an operation S210.

The radio frequency signal from the interference source 200 may be received in the absence of any data and/or control radio frequency signal intended for and terminating at the receiver 100 in an operation S210.

At the covariance estimator 132, a covariance matrix estimate based on the received radio frequency signal provided through the signal processing paths 180₁ and 180₂ from the signal receiving antennas 105₁ and 105₂ to the covariance estimator 132 is determined in an operation S220. The covariance estimator 132 receives a plurality of processed radio frequency signals each from one of the signal processing paths 180₁ and 180₂. The number of processed radio frequency signals corresponds to the number of antennas 105₁ and 105₂.

At the noise estimator 135, a noise estimate $\hat{N}$ is determined assuming unbalanced channel frequency responses in an operation S230. The unbalanced channel frequency responses may be attributed to at least one of the differing signal propagation paths 210₁ and 210₂ and/or differing signal processing paths 180₁ and 180₂.

In order to take account of the unbalanced channel frequency responses associated with each of the processed radio frequency signals supplied to the covariance estimator 132, solving the aforementioned polynomial equation being function of the noise estimate $\hat{N}$ on the basis the elements $c_{jk}$, where j, k=1, 2, of the covariance matrix estimate C allows for determining the noise estimate $\hat{N}$. The polynomial equation has an order equal to the number n=2 of the antennas 105₁ and 105₂ with respect to the noise estimate $\hat{N}$.

In particular, the polynomial equation for two antenna is given as following:

$$(c_{11} - \hat{N}) \cdot (c_{22} - \hat{N}) = c_{12} c_{21} \Leftrightarrow \hat{N}^2 - \hat{N}(c_{11} + c_{22}) + c_{11} c_{22} - c_{12} c_{21} = 0.$$

The polynomial equation of second order is solvable analytically for the noise estimate $\hat{N}$ by making following calculation in an operation S235:

$$\hat{N} = \frac{T - \sqrt{T^2 - 4\Delta}}{2},$$

-continued $$\Delta = c_{11}c_{22} - c_{12}c_{21}, \text{ and}$$

$$T = c_{11} + c_{22}.$$

The complexity of the calculation to determine the noise estimate $\hat{N}$ for a receiver 100 with two antennas $105_1$ and $105_2$ may be reduced with respect to limiting cases. The flow diagram schematically shown in FIG. 4 exemplifies an operational flow for determining a noise estimate $\hat{N}$ for a receiver with two antennas considering the limiting cases where the interference signal I is significantly greater than the noise N, i.e. I>>N, and the noise N significantly greater than the interference signal I, i.e. N>>I.

In an operation S240, the noise estimator 135 may be arranged to first calculate a quotient Q:

$$Q = \frac{c_{11}c_{22}}{c_{12}c_{21}}$$

As shown above, $Q \approx 1 \Leftrightarrow I >> N$ and $Q >> 1 \Leftrightarrow N >> I$.

In an operation S241, it is determined whether the strength of the interference signal I is the dominant contribution in the covariance matrix estimate C. It is determined whether the quotient $Q \approx 1$, e.g. by comparing the by comparing the absolute value of the difference Q−1 with a predefined threshold $Q_0$. The predefined threshold $Q_0$ may be application dependent on an application and use case. If this is true, the noise estimate $\hat{N}$ is calculated in accordance with following approximation in an operation S242:

$$\hat{N} \approx \frac{\Delta}{T}.$$

In case the strength of the interference signal I is the dominant contribution in the covariance matrix estimate C, then it is determined whether the noise N is the dominant contribution in the covariance matrix estimate C in an operation S243. It is determined whether the quotient Q>>1, e.g. by comparing the quotient Q with a predefined threshold $Q_1$. The predefined threshold $Q_1$ ($Q_1$>>1) may be dependent on an application and use case. If this is true, the noise estimate $\hat{N}$ is calculated in accordance with following approximation in an operation S244:

$$\hat{N} \approx \min\{c_{11}, c_{22}\}.$$

Figure 4:
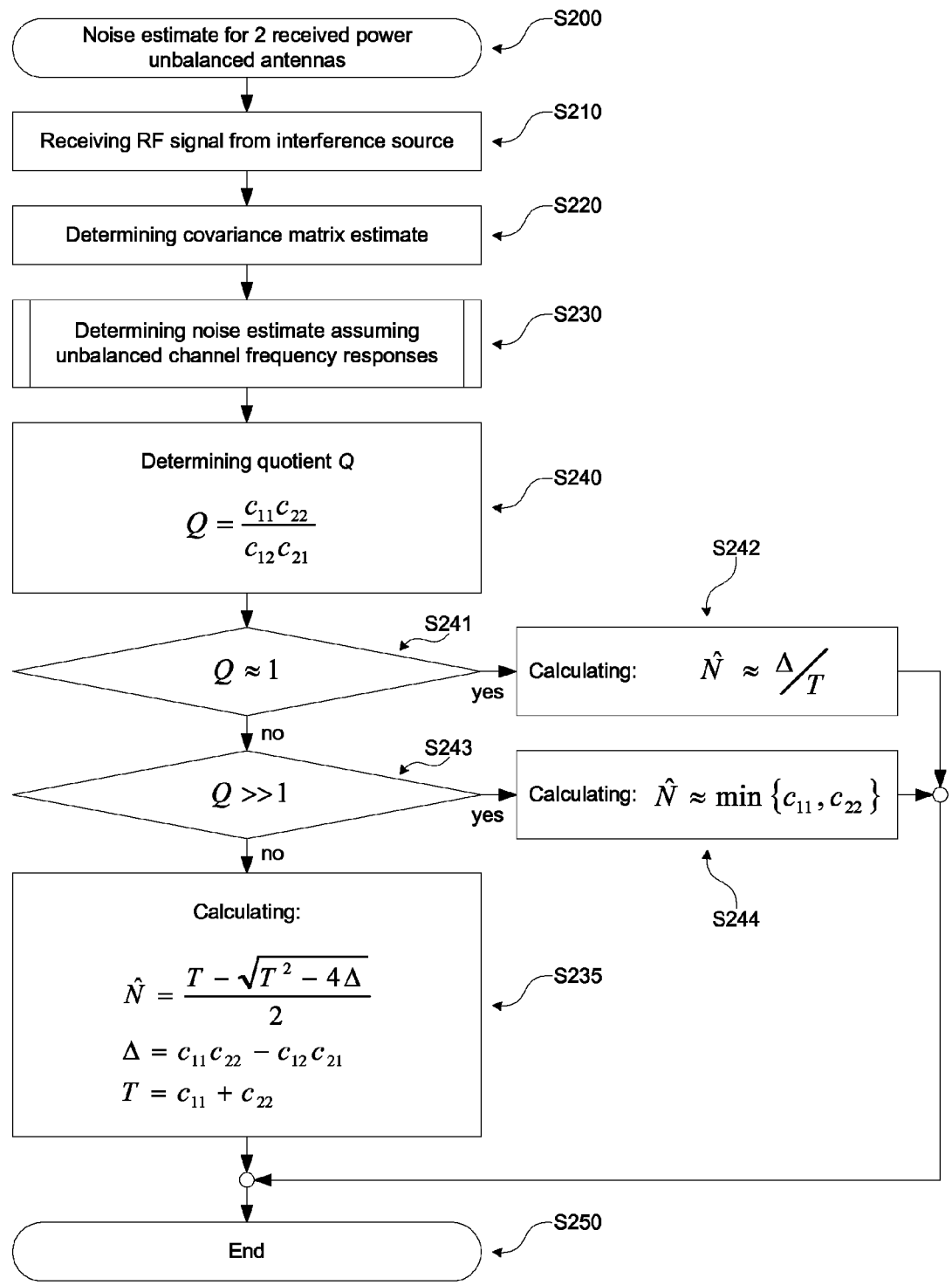
FIG. 4 schematically illustrates another exemplary flow diagram for determining a noise estimate in case of two received power unbalanced antennas according to an embodiment of the present application.

In case neither the strength of the interference signal I or the noise is the dominant contribution in the covariance matrix estimate C, the noise estimate $\hat{N}$ is calculated as exemplified with respect to FIG. 4.

Figure 5:
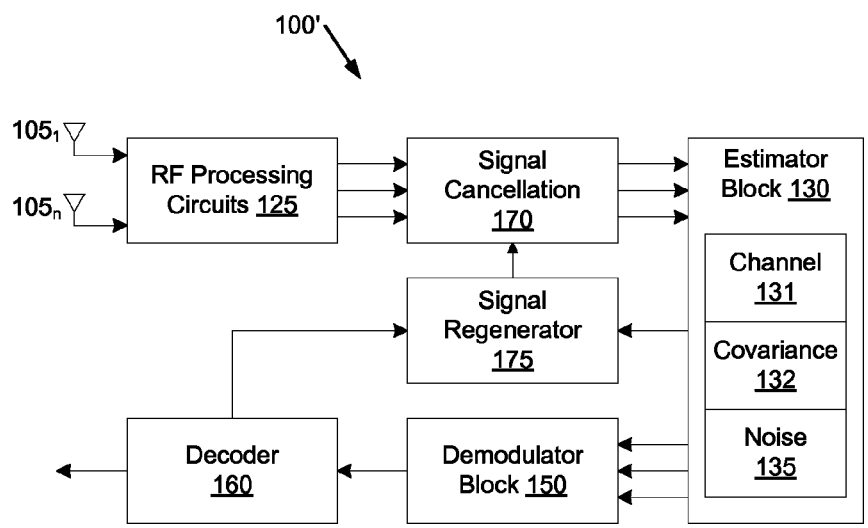
FIG. 5 schematically illustrates a block diagram of another exemplary receiver according to an embodiment of the present application.

Please note that only additional operations with respect to the determining of the noise estimate $\hat{N}$ by approximation are described with reference to FIG. 5. The description with reference to FIG. 4 applies likewise to the further operations schematically illustrated in FIG. 5, which are not described in detail in order to avoid unnecessary repetitions.

The above description sets forth the determination of a noise estimate $\hat{N}$ on the basis of a radio frequency signal received from the interference source 200 in the absence of any data and/or control radio frequency signal intended for and terminating at the receiver 100'. Referring now to FIG. 4, it will be understood that the aforementioned methodology is also applicable in case data and/or control radio frequency signal intended for and terminating at the receiver 100 is received.

FIG. 4 schematically illustrates a block diagram of a receiver architecture 100' according to another example of the present invention. The receiver architecture 100' comprises RF front end circuits 125, a signal cancellation block 170, an estimation block 130, a demodulator block 150, a decoder 160 and a signal regenerator block 175.

It should be understood that the RF frontend processing circuits 125 may comprise individual signal processing paths for each antenna of the receiver architecture 100' as above described with reference to FIG. 1. In particular, the RF frontend processing circuits of the receiver architecture 100' should be understood to comprise inter alia front end receiver circuits, analog-to-digital converters (ADCs), and FFT blocks as set forth above with to FIG. 1.

The front end receiver circuits are each associated with respective one of antennas $105_1$ to $105_n$ and may further include one or more functional blocks for low-noise amplification, frequency down-conversion, analog filtering, and the like. The RF signals outputted by the respective front end receiver circuit may be digitized by a respective one of the analog-to-digital converters (ADCs). The digitized RF signals outputted by the ADCs may be further signal processed including e.g. baseband filtering by a respective digital filter block (not shown) and cyclic prefix (CP) removing by a CP removal bloc (not shown) and the like. The digitized RF signals may be processed by the frequency transform block of the respective one of the processing paths at determined timing instances. The resulting sets of frequency domain samples for all subcarriers may be stored in a buffer and utilized by the estimation block 130 including inter alia a channel estimation block 131 and a covariance matrix estimation block 132 to produce channel estimates for the sets of frequency domain signals.

The demodulator block 150 should be understood to comprise a MIMO signal separation block, inverse frequency transform blocks, demodulator blocks and a P/S converter block as set forth above with reference to FIG. 1. In particular, the MIMO signal separation block may output one or more signals representing one or more sequences of code words. The receiver 100' may provide an inverse Fast Fourier transform (IFFT) block, and a demodulator block for each sequence of code words in the signal outputted by the MIMO signal separation block. The processing of the sequences of code words may further comprise a deinterleaver block (not shown) to perform processing to deinterleave the bit sequence interleaved in the transmitter and an error correction decoder block (not shown) to perform error correction decoding processing to obtain the transmitted information bit sequence. A P/S converter block performs processing to arrange parallel processed sequences of code words in series. The output of the P/S converter block is delivered to an upper layer as information data. The receiver 100 includes a decoder block 160, which is configured to receive from the P/S demodulator block 150 the sequences of code words in series and decode the sequences of code words into separate channels.

The receiver 100' shown in FIG. 4 according to an example of the present application further includes a signal regeneration block 175 and a signal cancellation block 170. The signal regeneration block 175 is arranged to regenerate a signal received by the antennas $105_1$ to $105_n$.

The signal to be regenerated by the signal regeneration block 175 may contain data and/or control information, which is unknown to the receiver 100' at time of reception.

In order to regenerate the signal received by the antennas $105_1$ to $105_n$, The decoder 160 provides a decoded signal to the signal regeneration block 175 and the signal regeneration block 175 regenerates the signal received by the antennas $105_1$ to $105_n$ on the basis of a decoded signal obtained from the decoder 160 and channel condition information provided by the estimation block 130, in particular channel response estimate provided by the channel response estimation block.

The signal to be regenerated by the signal regeneration block 175 may be known in advance or at time of reception for instance because a predefined signal is expected to be received. For instance a known signal may be a pilot signal or a reference signal transmitted to the receiver 100' from a counterpart transmitter. Hence, a decoded signal provided by the decoder 160 is not required by the signal regeneration block 175. The signal regeneration block 175 regenerates the signal received by the antennas $105_1$ to $105_n$ on the basis of a predefined signal corresponding to the signal received by the antennas $105_1$ to $105_n$ and channel condition information provided by the estimation block 130, in particular channel response estimate provided by the channel response estimation block.

On the basis of the regenerated signal outputted by the signal regenerator block 175, the signal cancellation block arranged with the RF frontend processing circuits 125 is capable to cancel a signal intended for and terminating at the receiver 100' from the signal processing at the estimation block 130. It should be understood that the signal cancellation block 170 may be arranged in particular with the frequency domain processing of the RF signal. More particularly, the signal cancellation block 170 is arranged to apply signal cancellation on the buffer, which stores sets of frequency domain samples for all subcarriers outputted by the FFT blocks of the RF frontend processing circuits 125.

Accordingly, the estimation block 130 and in particular the covariance matrix estimation block 132 and the noise estimation block 135 thereof may operate on sets of frequency domain samples, from which a signal intended for and terminating at the receive 100' has been eliminated. Those skilled in the art understand from the above description that the methodology to determine a noise estimate according to an example of the present invention is also applicable in the presence of a data and/or control radio frequency signal intended for and terminating at the receiver 100'. The data and/or control radio frequency signal intended for and terminating at the receiver 100' are cancelled with the help of the signal regeneration and cancellation blocks 175, 170 before determining a noise estimate by the noise estimation block 135.

Those of skill in the art will readily recognize that elements depicted in FIG. 4, such as the RF front end processing circuits 125, filter blocks (not shown), CP removal blocks (not shown), FFT blocks, inverse FFT blocks, channel response, covariance matrix and noise estimation blocks 130, 131, 132 and 153, the MIMO signal separation block, demodulator blocks, the P/S converter block 155, decoder block 160, the signal regenerator block 175 and the signal cancellation block 170 may be implemented as analog or digital hardware circuits, as programmable logic coupled with appropriate firmware, or as software modules executing one or more a general-purpose processors or Digital Signal Processors (DSP). Furthermore, any or all of the functional blocks may be merged, and/or functionality included in one block may be separated into two or more functional blocks.

Figure 6:
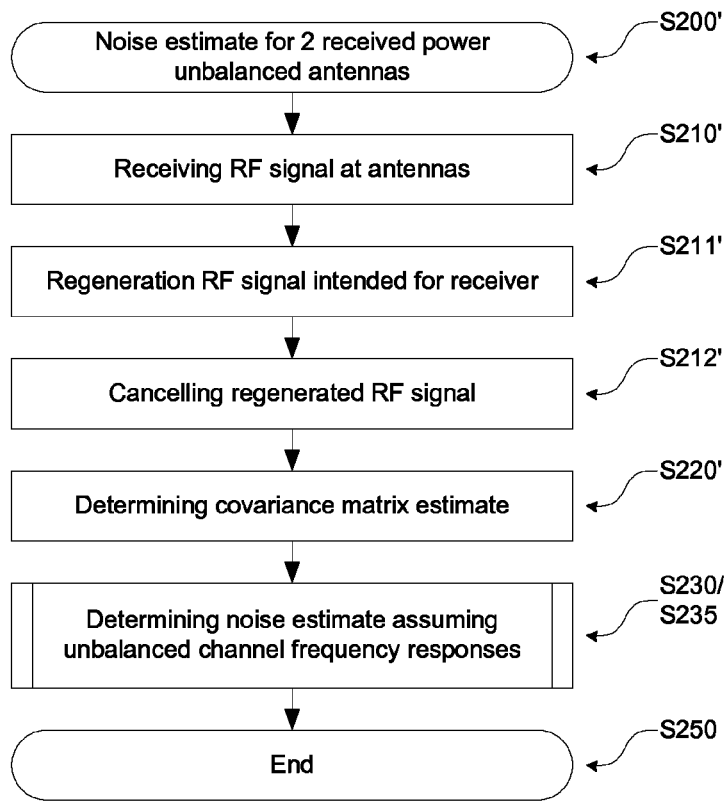
FIG. 6 schematically illustrates an exemplary flow diagram for determining a noise estimate in case of two received power unbalanced antennas according to another embodiment of the present application.
Figure 7:
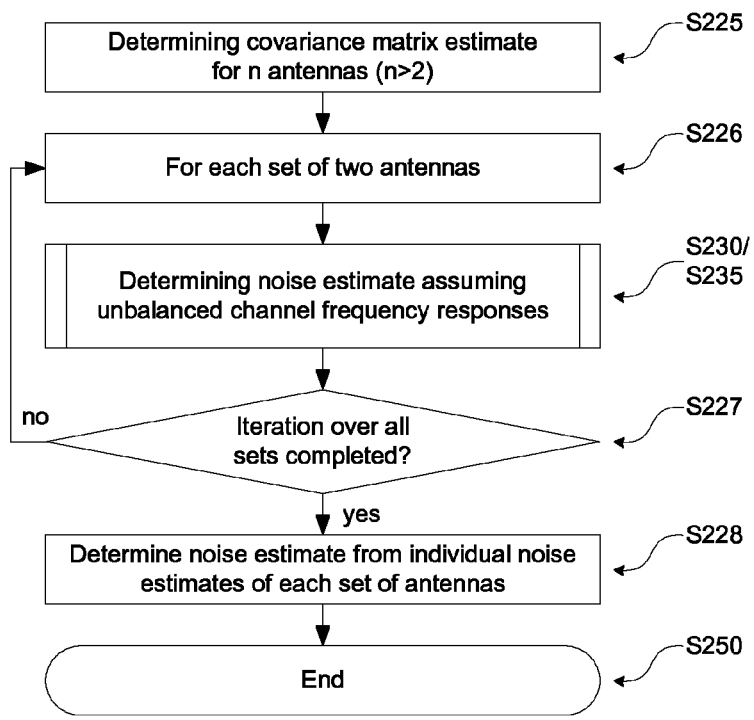
FIG. 7 schematically illustrates an exemplary flow diagram for determining a noise estimate in case of n received power unbalanced antennas according to an embodiment of the present application.

Referring now to FIG. 6, a further flow diagram is schematically illustrated exemplifying an operational flow for determining a noise estimation at a receiver with two antennas, n=2, receiving unbalanced power. The flow diagram of FIG. 6 exemplifies the operational flow for determining a noise estimation at a receiver with signal cancellation capability such as the schematically illustrated receiver of FIG. 5 described above.

A radio frequency signal is received at the two antennas $105_1$ and $105_2$ of the receiver 100' in an operation S210'. The received radio frequency signal is a superposition of a radio frequency signal transmitted by a transmitter and a radio frequency signal from the interference source 200. The radio frequency signal transmitted by a transmitter is intended for the receiver 100' and carries data and/or control radio frequency signal to be decoded at the receiver 100'. In particular, the radio frequency signal from the interference source 200 propagates over differing signal propagation paths $210_1$ and $210_2$ to the respective antennas $105_1$ and $105_2$. The received power of the radio frequency signal from the interference source 200 is unbalanced at the antennas $105_1$ and $105_2$.

The received radio frequency signal is processed by the receiver to decode the data and/or control radio frequency signal transmitted from the transmitter. The processing of the received radio frequency signal includes the operations described above with reference to FIGS. 1 and 5.

The processing of the received radio frequency signal may comprise low-noise amplifying, frequency down-converting, and analog filtering in time domain, digitizing the RF signal into digitizes RF signal formed of streams of sample data. Baseband filtering and cyclic prefix (CP) removing may be further applied to the sample data streams before the sample data of the streams is transformed into frequency domain. The resulting sets of frequency domain samples for all subcarriers may be stored in a buffer and utilized by the channel response estimation for determining the channel response estimate estimating the channel conditions experienced by the RF signal transmitted from the transmitter to the receiver 100'. Signal separation and channel compensation is applied to the sets of frequency domain samples, which are then inverse transformed back into time domain. The time domain sample data are further demodulated based on the modulation performed in the transmitter and finally decoded to obtain the data and/or control radio frequency signal originally transmitted by the transmitter to the receiver 100'.

On the basis of the decoded data and/or control radio frequency signal and the determined channel response estimate, the radio frequency signal of the transmitter as received by the receiver 100' is regenerated in an operation S211'. In an operation S212', the regenerated signal is cancelled from the stored sets of samples, which yields to sets of samples representing a residual radio frequency signal. The residual radio frequency signal omits the signal contribution of the transmitter.

A covariance matrix is determined from the sets of samples representing a residual radio frequency signal in an operation S220'.

At the noise estimator 135, a noise estimate $\hat{N}$ is determined on the basis of the sets of samples representing the residual radio frequency signal after signal cancellation in an operation S230. The determination of the noise estimate $\hat{N}$ is performed by taking into account unbalanced channel frequency responses. The unbalanced channel frequency responses may be attributed to at least one of the differing signal propagation paths $210_1$ and $210_2$ and/or differing signal processing paths $180_1$ and $180_2$.

The noise estimate $\hat{N}$ is obtained by making following calculation in an operation S235:

$$\hat{N} = \frac{T - \sqrt{T^2 - 4\Delta}}{2},$$

$$\Delta = c_{11}c_{22} - c_{12}c_{21}, \text{ and}$$

$$T = c_{11} + c_{22},$$

wherein $c_{jk}$, where j, k=1, 2, are the elements of the covariance matrix estimate C determined on the basis of the residual radio frequency signal after signal cancellation.

The above methodology for estimating the determining a noise estimation at a receiver with two antennas, n=2, receiving unbalanced power may be also applied to determine a noise estimation at a receiver with more than two antennas, n>2.

Starting from a covariance matrix obtained from a radio frequency signal received at the receiver in the absence of any data and/or control radio frequency signal intended for and terminating at the receiver 100, in an operation S220, or from a residual radio frequency signal, from which the signal contribution of a transmitter transmitting data and/or control radio frequency signal intended for and terminating at the receiver 100' is cancelled, in an operation S220', the subset of covariance elements $c_{jk}$ relating to a set of 2 antennas are used in an operation S226.

In case of n=3 antennas a first subset comprises the covariance elements $c_{jk}$ where j, k=1, 2 (relating to the antennas identified by the indexes 1 and 2), a second set comprises the covariance elements $c_{jk}$ where j, k=1, 3 (relating to the antennas identified by the indexes 1 and 3), and a third set comprises the covariance elements $c_{jk}$ where j, k=2, 3 (relating to the antennas identified by the indexes 2 and 3). In general, (n, 2)=n!/2(n-2)! sets of covariance elements $c_{jk}$ can be obtained from the covariance matrix in case of n antennas.

For each subset of covariance elements relating to a set of two antennas, an individual noise estimate $\hat{N}_m$ for each set of two antennas is obtained in operations S230, S235 as described above in an iteration S227. The iteration yields to (n, 2)=n!/2(n-2)! individual noise estimates $\hat{N}_m$, where $$m = 1, \ldots, \frac{n!}{2(n-2)!}.$$

In case of n=3 antennas above, the iteration yields to $$\frac{3!}{2(3-2)!} = 3$$

individual noise estimates $\hat{N}_m$, where m=1, . . . , 3.

In an operation S228, a noise estimate $\hat{N}$ is determined from the n!/2 individual noise estimates $\hat{N}_m$ for instance by averaging $$\hat{N} = \frac{2}{n!} \sum_{m=1}^{n!/2} \hat{N}_m.$$

The present application may be applied in a base station, NodeB or eNodeB that monitors the radio frequency transmission conditions to for instance switch the link adaptation and scheduling in an uplink communication. A base station may be a station that communicates with the cellular devices (user equipment, UEs) and may be likewise referred to as a NodeB, eNodeB, an access point, etc.

Each base station may provide communication coverage for a particular geographic area. In 3GPP, the term "cell" can refer to a coverage area of a NodeB/eNodeB and/or an NodeB/eNodeB subsystem serving this coverage area, depending on the context in which the term is used. A base station may provide communication coverage for a macro cell, a metro cell, a nano cell, a pico cell, a femto cell, and/or other types of cell. A macro cell may cover a relatively large geographic area (e.g., several kilometers in radius) and may for instance allow unrestricted access by UEs with service subscription. A pico cell may cover a relatively small geographic area and may for instance allow unrestricted access by UEs with service subscription. A femto cell may cover a relatively small geographic area (e.g., a home) and may for instance allow restricted access by UEs having association with the femto cell (e.g., UEs in a Closed Subscriber Group (CSG), UEs for users in the home, etc.). A base station for a macro cell may be referred to as a macro base station. A base station for a pico cell may be referred to as a pico base station. A base station for a femto cell may be referred to as a femto base station or a home base station. In general, the designations of the base station/cells/(e) NodeBs indicate and relate to a measure of the coverage area thereof and the number of simultaneously served UEs.

Figure 8:
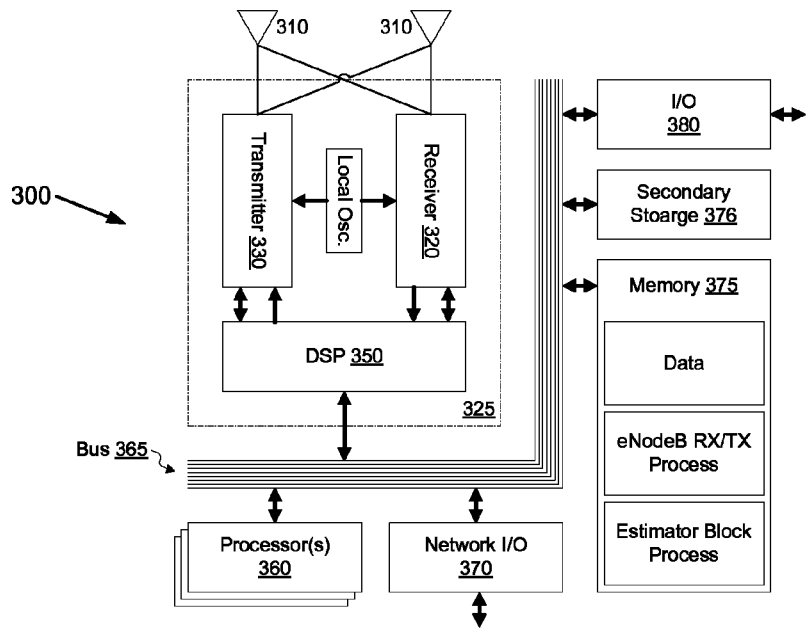
FIG. 8 schematically illustrates a block diagram of another exemplary receiver according to an embodiment of the present application.

The estimator functionalities described above may be part of a RX/TX (receive and transmit) process of the base station. With reference to FIG. 8, a possible implementation of a receiver arrangement 100 as part of an example base station 300 is illustratively shown. In general, the base station 300 is configured according to an example of the present disclosure.

Signals received from antennas 310 are input to a transceiver 325, which comprises for instance a receiver section 320 and a transmitter section 330. The receiver section 320 may perform such common receiver functions as signal amplification, frequency down conversion, filtering, channel selection and the like. Analog to digital (ADC) conversion of a received signal allows more complex communication functions such as demodulation and decoding to be performed in a digital signal processor (DSP) 350. In a similar manner, signals to be transmitted are processed, including modulation and encoding for example, by the DSP 350 and input to transmitter section 330 for digital to analog (DAC) conversion, frequency up conversion, filtering, amplification and transmission over the cellular communication network via the antennas 310. The DSP 350 not only processes communication signals, but also provides for receiver and transmitter control. For example, the gains applied to communication signals in receiver 320 and transmitter 330 may be adaptively controlled through automatic gain control algorithms implemented in DSP 350.

In addition to a processor 360 (which may be referred to as a central processor unit or CPU), the base station 300 might include network connectivity devices 370, a memory 375 including random access memory (RAM) and read only memory (ROM), a secondary storage 376, and input/output (I/O) devices. These components may communicate with one another via one or more buses 365, switched interconnects, fabrics, and/or any combination thereof. In some cases, some of these components may not be present or may be combined in various combinations with one another or with other components not shown. These components might be located in a single physical entity or in more than one physical entity. Any actions described herein as being taken by the base station 300 might be taken by any one of the components thereof, a combination of the components thereof, the processor 360 alone or by the processor 350 in conjunction with one or more components shown or not shown in FIG. 11, such as a digital signal processor (DSP) 350. Although the DSP 350 is shown as a separate component, the DSP 350 might be incorporated into the processor 360.

The central processor 360 and the digital signal processor (DSP) 350 should be understood as processing units, which execute instructions, codes, computer programs, or scripts that it might access from the network connectivity devices 370, the input/output (I/O) devices, the memory 375 (e.g. RAM and/or ROM) or secondary storage 376, which might include various disk-based systems such as hard disk, floppy disk, or optical disk or any other mass storage technology based devices. While only one CPU 360 and/or DPS 350 is shown, multiple processors or processing cores may be present. Thus, while instructions may be discussed as being executed by one or the processors, the instructions may be executed simultaneously, serially, or otherwise by one or multiple processors. The processor 360 may be implemented as one or more CPU chips.

The network connectivity devices 370 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, LTE-A (LTE advanced) radio transceiver devices, worldwide interoperability for microwave access (WiMAX) devices, and/or other well-known devices for connecting to networks. These network connectivity devices 370 may enable the processor 360 to communicate with the Internet or with one or more telecommunications networks or other networks from which the processor 360 might receive information or to which the processor 360 might output information. The network connectivity devices 370 might also include one or more transceiver components capable of transmitting and/or receiving data wirelessly.

The RAM might be used to store volatile data and perhaps to store instructions that are executed by the processor 360. The ROM is a non-volatile memory device that typically has a smaller memory capacity than the memory capacity of the secondary storage 376. ROM might be used to store instructions and perhaps data that are read during execution of the instructions. Access to both RAM and ROM is typically faster than to secondary storage 376, which may server as a mass storage. The secondary storage 376 is typically comprised of one or more solid state drives, disk drives or tape drives and might be used for non-volatile storage of data or as an over-flow data storage device if RAM is not large enough to hold all working data. Secondary storage 376 may be used to store programs that are loaded into RAM when such programs are selected for execution.

Further, one or more I/O devices 380 may include liquid crystal displays (LCDs), touch screen displays, keyboards, keypads, switches, mice, card readers, video monitors, or other well-known input/output devices. The transceiver 325 might be also considered to form a component of the I/O devices 380 instead of or in addition to being a component of the network connectivity devices 370.

As will be readily apparent to one skilled in the art, the RX/TX process may configure the one or more processors 350, 360 to operate the transceiver 325 in a manner that provides voice communication and data services over a wireless radio frequency cellular communications network. The estimator block process may configure the one or more processors 350, 360 to operate the transceiver 325 to determine a noise estimate as described above with reference to FIGS. 3, 4, 6 and/or 7. In particular, the estimator block process is implemented on the basis of one or more software components executable on the one or more processor(s) 360 and the digital signal processor (DSP) 350. More particularly, the estimator block process is configured to make use of accelerator components implemented in the base station 300 such as one or more fast Fourier transform components being part of the digital signal processor (DSP) 350.

Figure 9:
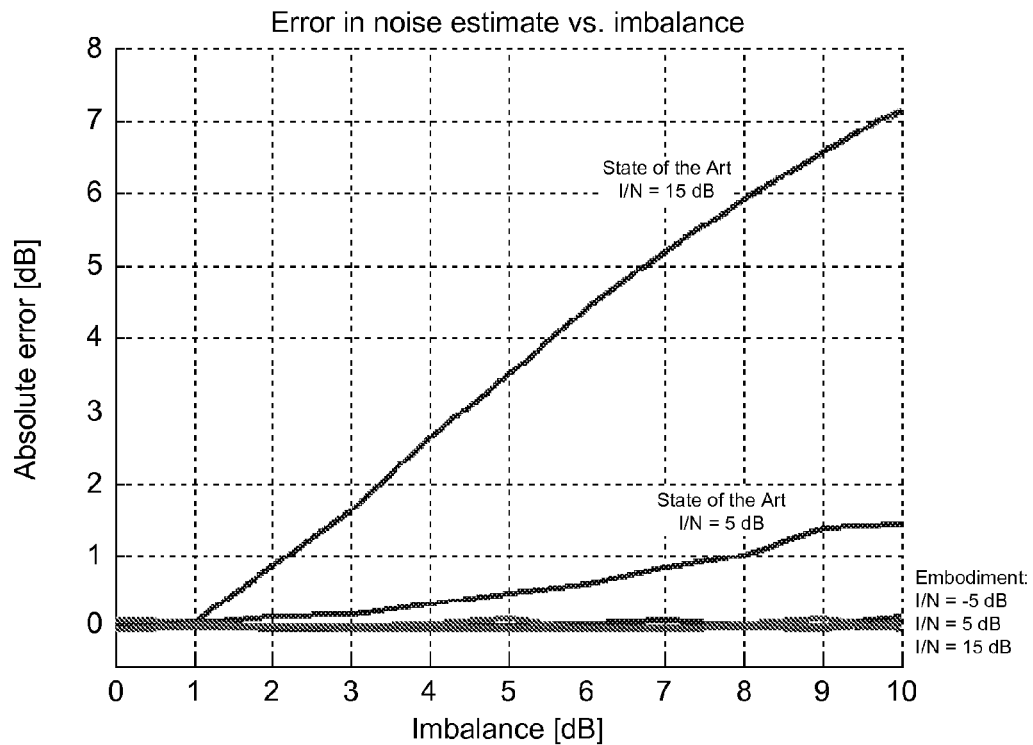
FIG. 9 illustrates graph diagrams comparing absolute errors of noise estimates versus imbalance determined according to state of the art methodologies and according to an exemplary methodology in accordance with the flow diagram of FIG. 3.

FIG. 9 exemplarily illustrates the resulting noise estimate $\hat{N}$ when applying state of the art methodologies assuming balanced received power conditions (balanced antennas, balanced channel frequency responses) and the methodology of the present application exemplified above with reference to FIG. 3, which makes provisions for unbalanced received power conditions (received power unbalanced antennas, unbalanced channel frequency responses). As understood from the graph diagrams shown in FIG. 9, the absolute error of the noise estimate $\hat{N}$ significantly increases with increasing imbalance and the ratio I/N of interference signal I with respect to the noise N.

Figure 10:
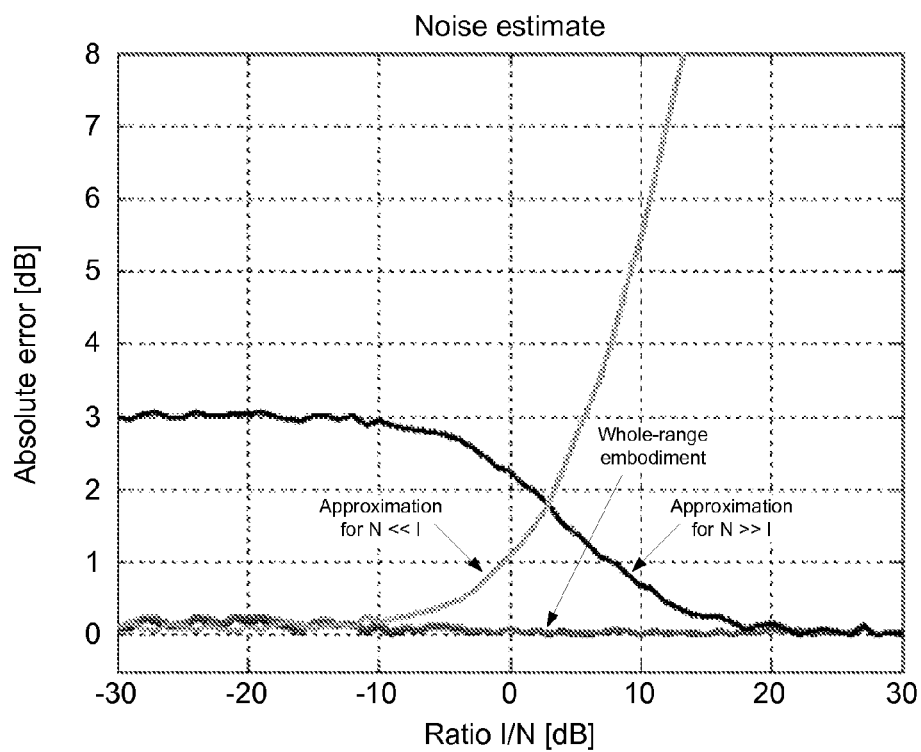
FIG. 10 illustrates graph diagrams comparing absolute errors of noise estimates versus imbalance determined according to state of the art methodologies and according to exemplary methodology in accordance with the flow diagram of FIG. 4.

FIG. 10 exemplarily illustrates the applicability of the approximations as described above with reference to FIG. 4 for the aforementioned limiting cases.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To illustrate clearly this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of determining a noise estimate in case of receiver power unbalanced antennas, said method comprising:

receiving radio frequency signal at least from an interference source through a plurality of antennas over different propagation paths and processing paths;
determining a covariance matrix estimate based on the received radio frequency signal; and
determining the noise estimate by calculating $$\hat{N} = \frac{T - \sqrt{T^2 - 4\Delta}}{2},$$

wherein $\hat{N}$ is the noise estimate; and
$\Delta = c_{11}c_{22} - c_{12}c_{21}$;
$T = c_{11} + c_{22}$; and
$c_{jk}$, where j, k=1, 2, are elements of the covariance matrix estimate relating to two antennas of the plurality of antennas.

2. The method according to claim 1, wherein the received radio frequency signal only comprises a radio frequency signal transmitted from at least one interference source in absence of an intended data or control radio frequency signal.

3. The method according to claim 2, further comprising: determining a quotient Q:

$$Q = \frac{c_{11}c_{22}}{c_{12}c_{21}};$$

performing at least one of
determining whether the quotient is approximately 1, $Q \approx 1$, which is indicative of the contribution of the interference signal strength being significantly bigger than the contribution of the noise; and
determining whether the quotient is significantly bigger than 1, $Q \gg 1$, which is indicative of the contribution of the noise being significantly bigger than the contribution of the interference signal strength.

4. The method according to claim 1, wherein the received radio frequency signal comprises a radio frequency signal transmitted from at least one interference source and a radio frequency signal transmitted from a transmitter, wherein the radio frequency signal transmitted from the transmitter comprises at least one of a data and a control radio frequency signal, the method further comprising:
storing the received radio frequency signal;
regenerating a radio frequency signal representative of the radio frequency signal transmitted from the transmitter; and
cancelling the regenerated radio frequency signal from the stored received radio frequency signal to obtain a residual radio frequency signal,
wherein the covariance matrix estimate is determined based on the residual radio frequency signal of the received radio frequency signal.

5. The method according to claim 4, wherein the radio frequency signal representative of the radio frequency signal transmitted from the transmitter is regenerated based on a channel response estimate.

6. The method according to claim 4, further comprising: determining a quotient Q:

$$Q = \frac{c_{11}c_{22}}{c_{12}c_{21}};$$

performing at least one of
- determining whether the quotient is approximately 1, $Q \approx 1$, which is indicative of the contribution of the interference signal strength being significantly bigger than the contribution of the noise; and
- determining whether the quotient is significantly bigger than 1, $Q \gg 1$, which is indicative of the contribution of the noise being significantly bigger than the contribution of the interference signal strength.

7. The method according to claim 1, further comprising:
determining whether the contribution of the noise is significantly bigger than the contribution of the interference signal strength; and
if this applies, determining the noise estimate by calculating $$\hat{N} \approx \min\{c_{11}, c_{22}\}.$$

8. The method according to claim 1, further comprising:
determining whether the contribution of the interference signal strength is significantly bigger than the contribution of the noise; and
if this applies, determining the noise estimate by calculating $$\hat{N} \approx \frac{\Delta}{T}.$$

9. A radio frequency receiver capable of determining a noise estimate in case of received power unbalanced antennas, the apparatus comprising:
- a plurality of antennas for receiving a radio frequency signal from an interference source over different propagation paths and processing paths;
- a covariance matrix estimator coupled through separate processing paths to a respective one of the plurality of antennas and arranged to determine an estimate of a covariance matrix based on the received radio frequency signal; and
- wherein the noise estimator is further arranged to calculate $$\hat{N} = \frac{T - \sqrt{T^2 - 4\Delta}}{2},$$

wherein $\hat{N}$ is the noise estimate; and
$\Delta = c_{11}c_{22} - c_{12}c_{21}$;
$T = c_{11} + c_{22}$; and
$c_{jk}$ are elements of the covariance matrix estimate.

10. The radio frequency receiver according to claim 9,
wherein the received radio frequency signal comprises a radio frequency signal transmitted from at least one interference source and a radio frequency signal transmitted from a transmitter, wherein the radio frequency signal transmitted from the transmitter comprises at least one of a data and a control radio frequency signal intended for being decoded at the receiver,
the radio frequency receiver further comprising:
- a buffer arranged in the processing paths, coupled to the covariance matrix estimator and provided to store the received radio frequency signal;
- a signal regenerator coupled to a decoder and arranged to regenerate a radio frequency signal representative of the radio frequency signal transmitted from the transmitter; and
- a signal cancellator arranged to cancel the regenerated radio frequency signal from the stored received radio frequency signal to obtain a residual radio frequency signal,
- wherein the covariance matrix estimator is arranged to determine the estimate of the covariance matrix based on the residual radio frequency signal of the received radio frequency signal.

11. The radio frequency receiver according to claim 10, further comprising:
- a channel response estimator coupled through separate processing paths to a respective one of the plurality of antennas and arranged to determine an estimate of a channel response based on the received radio frequency signal.

12. The radio frequency receiver according to claim 9,
wherein in case the contribution of the noise is significantly bigger than the contribution of the interference signal strength, the noise estimator is further arranged to determine the noise estimate by calculating $$\hat{N} \approx \min\{c_{11}, c_{22}\}.$$

13. The receiver according to claim 12, wherein the noise estimator is further arranged to determine a quotient Q:

$$Q = \frac{c_{11}c_{22}}{c_{12}c_{21}};$$

and arranged to perform at least one of
- determining whether the quotient is approximately 1, $Q \approx 1$, which is indicative of the contribution of the interference signal strength is significantly bigger than the contribution of the noise, and
- determining whether the quotient is significantly bigger than 1, $Q \gg 1$, which is indicative of the contribution of the noise is significantly bigger than the contribution of the interference signal strength.

14. The radio frequency receiver according to claim 9,
wherein in case the contribution of the interference signal strength is significantly bigger than the contribution of the noise, the noise estimator is further arranged to determine the noise estimate by calculating $$\hat{N} \approx \frac{\Delta}{T}.$$

15. The receiver according to claim 14, wherein the noise estimator is further arranged to determine a quotient Q:

$$Q = \frac{c_{11}c_{22}}{c_{12}c_{21}};$$

and arranged to perform at least one of
- determining whether the quotient is approximately 1, $Q \approx 1$, which is indicative of the contribution of the interference signal strength is significantly bigger than the contribution of the noise, and
- determining whether the quotient is significantly bigger than 1, $Q \gg 1$, which is indicative of the contribution of the noise is significantly bigger than the contribution of the interference signal strength.

16. A non-transitory, tangible computer readable storage medium bearing computer executable instructions for operating a radio frequency receiver capable of determining a noise estimate in case of unbalanced antennas, wherein the instructions, when executing on one or more processing devices, cause the one or more processing devices to perform a method comprising:
  determining a covariance matrix estimate based on a radio frequency signal received at least from an interference source through a plurality of antennas over different propagation paths and processing paths; and
  determining a noise estimate by calculating $$\hat{N} = \frac{T - \sqrt{T^2 - 4\Delta}}{2},$$

wherein $\hat{N}$ is the noise estimate; and
  $\Delta = c_{11}c_{22} - c_{12}c_{21}$;
  $T = c_{11} + c_{22}$; and
  $c_{jk}$, where j, k=1, 2, are elements of the covariance matrix estimate relating to two antennas of the plurality of antennas.

* * * * *